(12) United States Patent
Brodnex (10) Patent No.: US 11,072,291 B1
(45) Date of Patent: Jul. 27, 2021

(54) PERMIT HOLDER FOR A VEHICLE SUNVISOR

(71) Applicant: Elijah Brodnex, Lorain, OH (US)

(72) Inventor: Elijah Brodnex, Lorain, OH (US)

(*) Notice: Subject to any disclaimer, the term of this patent is extended or adjusted under 35 U.S.C. 154(b) by 0 days.

(21) Appl. No.: 16/920,810

(22) Filed: Jul. 6, 2020

Related U.S. Application Data (63) Continuation-in-part of application No. 15/919,267, filed on Mar. 13, 2018, now abandoned.

(51) Int. Cl.
*B60R 7/08* (2006.01)
*B60R 7/05* (2006.01)

(52) U.S. Cl.
CPC . *B60R 7/08* (2013.01); *B60R 7/05* (2013.01)

(58) Field of Classification Search
CPC .... B60R 7/05; Y10T 24/4012; Y10T 24/4406
USPC ............... 40/643, 644, 593, 470; 403/397
See application file for complete search history.

(56) References Cited

U.S. PATENT DOCUMENTS

| | | | |
|---|---|---|---|
| 4,961,249 A * | 10/1990 | Liu | B42F 9/001 24/500 |
| 5,613,725 A | 3/1997 | Lozano | |
| 6,052,067 A * | 4/2000 | Nuxoll | G08G 1/0955 340/908 |
| 6,276,081 B1 | 8/2001 | Shedd | |
| 6,899,371 B1 * | 5/2005 | Hammond | B60J 3/0208 296/97.11 |
| 7,150,120 B1 | 12/2006 | Naymik | |
| 7,373,745 B1 | 5/2008 | Massaad | |
| 7,686,373 B1 | 3/2010 | McCabe | |
| D697,556 S | 1/2014 | Massaad | |
| 2007/0289179 A1 | 12/2007 | Mortensen | |
| 2008/0148614 A1 | 6/2008 | Costar | |
| 2011/0067278 A1 | 3/2011 | Hulbert | |

* cited by examiner

*Primary Examiner* — Kristina N Junge
(74) *Attorney, Agent, or Firm* — Kyle A. Fletcher, Esq.

(57) ABSTRACT

The permit holder for a vehicle sunvisor comprises a visor clip, a placard clip, a first servo motor, a second servo motor, a controller, and a remote control key fob. The permit holder for a vehicle sunvisor may removably couple to a sun visor in a vehicle via the visor clip and may removably couple a parking placard to the sun visor such that the parking placard may be stored in a non-visible position during the operation of the vehicle and displayed in a visible position when the vehicle is parked. Upon receiving an activation signal from the remote control key fob, the controller may cause rotation of the first servo motor and the second servo motor thus moving the parking placard between the non-visible position and the visible position.

19 Claims, 9 Drawing Sheets

PERMIT HOLDER FOR A VEHICLE SUNVISOR

CROSS REFERENCES TO RELATED APPLICATIONS

This application is a continuation-in-part of U.S. application Ser. No. 15/919,267, filed Mar. 13, 2018.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicular accessories for the disabled, more specifically, a permit holder for a vehicle sunvisor.

SUMMARY OF INVENTION

The permit holder for a vehicle sunvisor comprises a visor clip, a placard clip, a first servo motor, a second servo motor, a controller, and a remote control key fob. The permit holder for a vehicle sunvisor may removably couple to a sun visor in a vehicle via the visor clip and may removably couple a parking placard to the sun visor such that the parking placard may be stored in a non-visible position during the operation of the vehicle and displayed in a visible position when the vehicle is parked. Upon receiving an activation signal from the remote control key fob, the controller may cause rotation of the first servo motor and the second servo motor thus moving the parking placard between the non-visible position and the visible position.

An object of the invention is to display a parking placard from a vehicle's sun visor.

Another object of the invention is to move the move the parking placard between a non-visible position parallel to the sun visor and a visible position below the sun visor.

A further object of the invention is to move the parking placard between positions upon receiving an activation signal transmitted by a remote control key fob.

Yet another object of the invention is to move the parking placard between positions upon receiving based upon input received from an in-vehicle activation control.

These together with additional objects, features and advantages of the permit holder for a vehicle sunvisor will be readily apparent to those of ordinary skill in the art upon reading the following detailed description of the presently preferred, but nonetheless illustrative, embodiments when taken in conjunction with the accompanying drawings.

In this respect, before explaining the current embodiments of the permit holder for a vehicle sunvisor in detail, it is to be understood that the permit holder for a vehicle sunvisor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the permit holder for a vehicle sunvisor.

It is therefore important that the claims be regarded as including such equivalent construction insofar as they do not depart from the spirit and scope of the permit holder for a vehicle sunvisor. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are mean tot be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Further-more, there is no intention to be bound by any expressed or implied theory presented in the preceding technical field, background, brief summary or the following detailed description. As used herein, the word "or" is intended to be inclusive.

Figure 1:
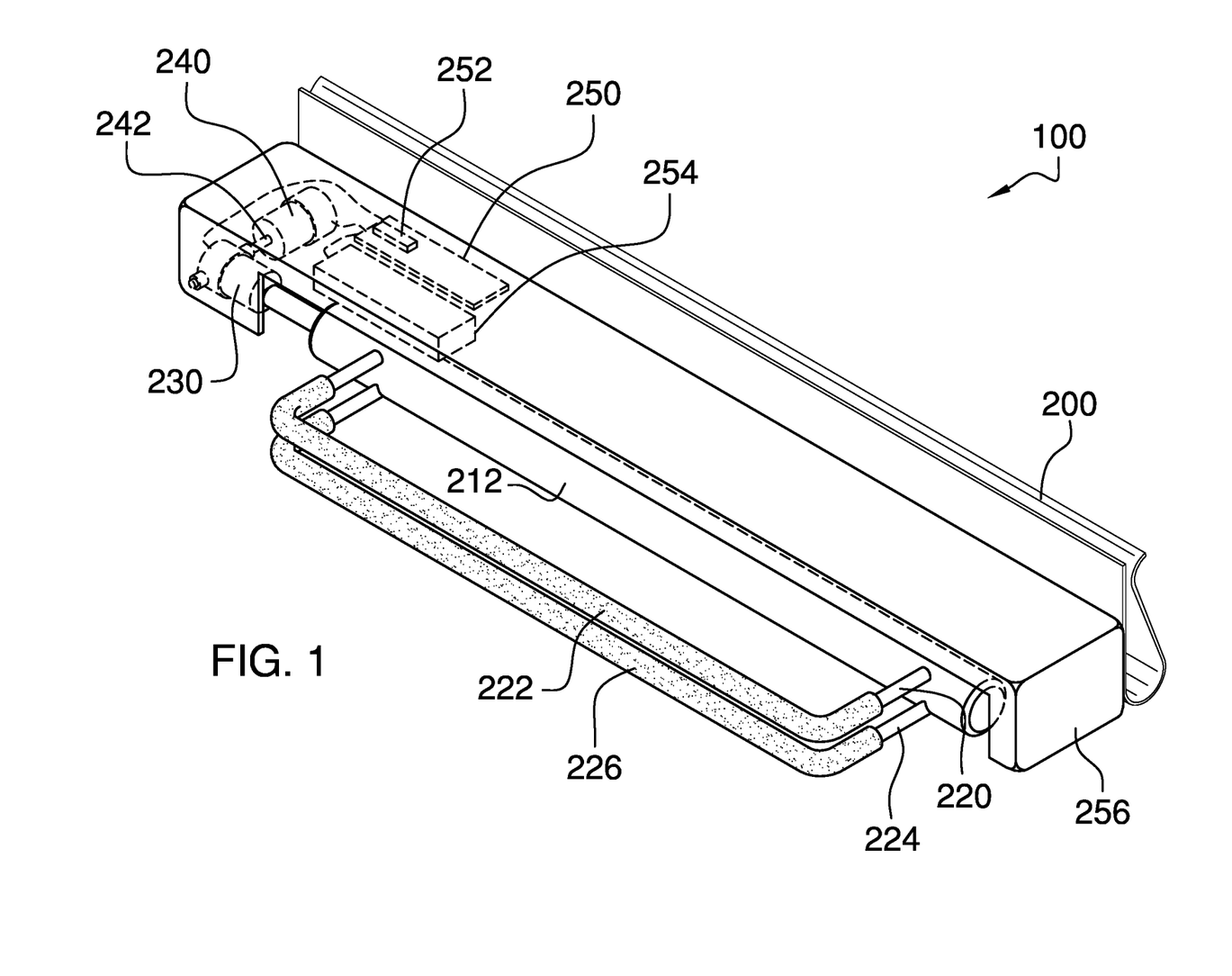
FIG. 1 is an isometric view of an embodiment of the disclosure illustrating the placard clip rotated to the non-visible position.
Figure 2:
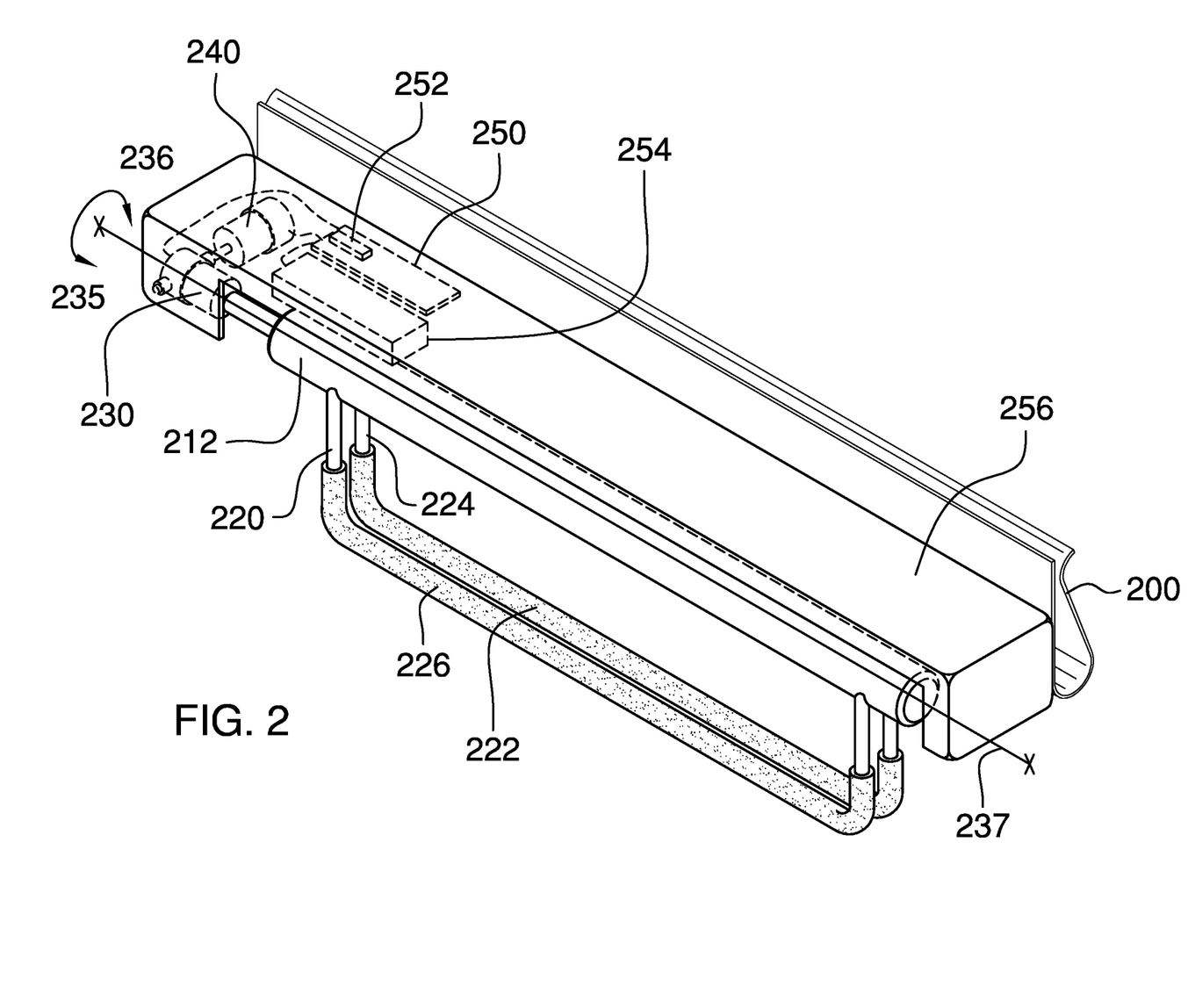
FIG. 2 is an isometric view of an embodiment of the disclosure illustrating the placard clip rotated to the visible position.
Figure 3:
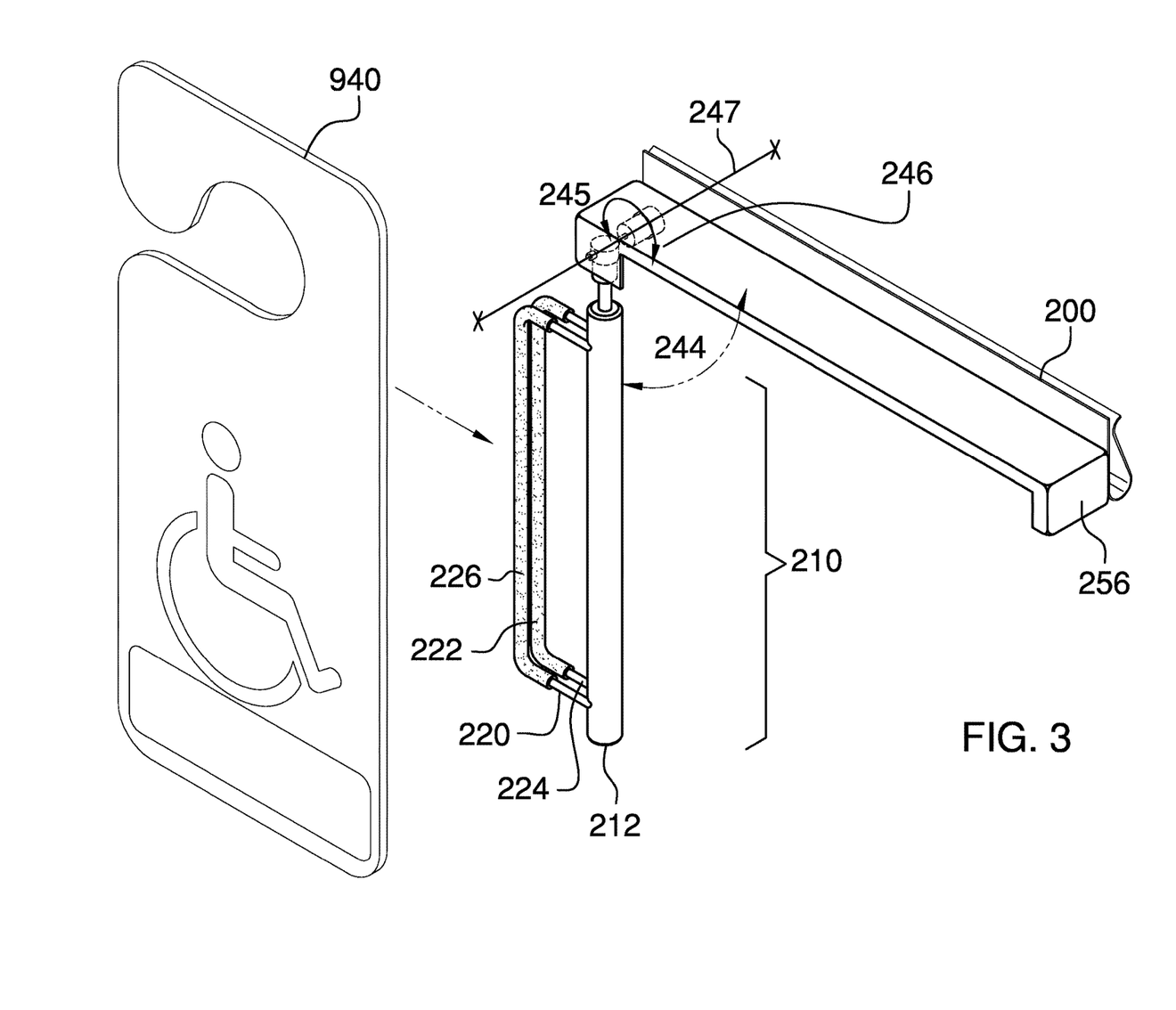
FIG. 3 is an isometric view of an embodiment of the disclosure illustrating the placard clip rotated to the visible position and accepting insertion of a parking placard.
Figure 4:
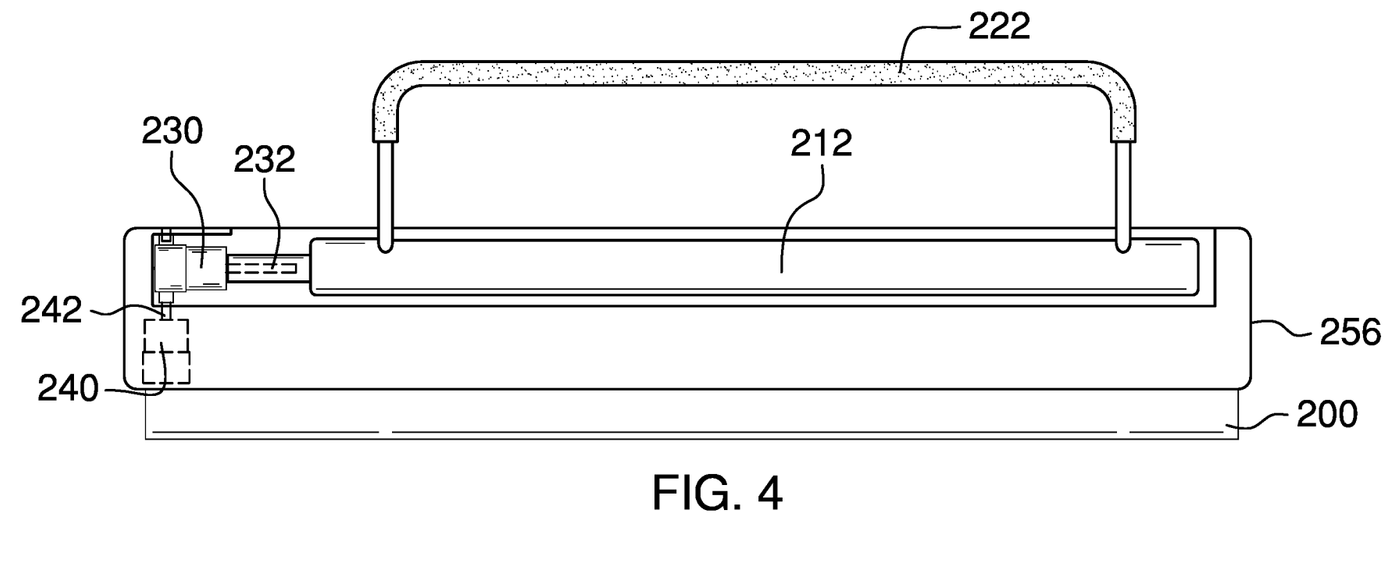
FIG. 4 is a bottom view of an embodiment of the disclosure illustrating the placard clip in the non-visible position.
Figure 5:
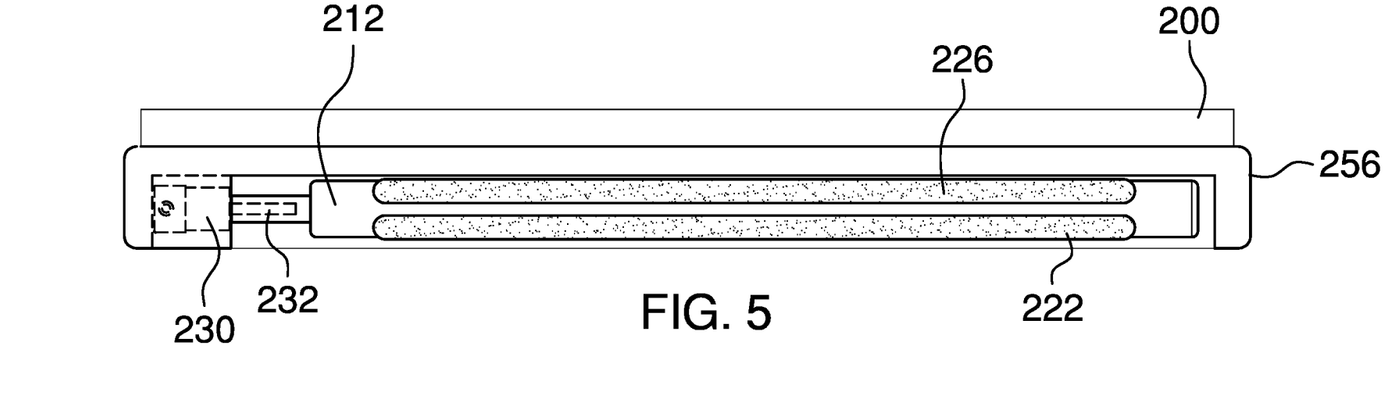
FIG. 5 is a front view of an embodiment of the disclosure illustrating the placard clip in the non-visible position.
Figure 6:
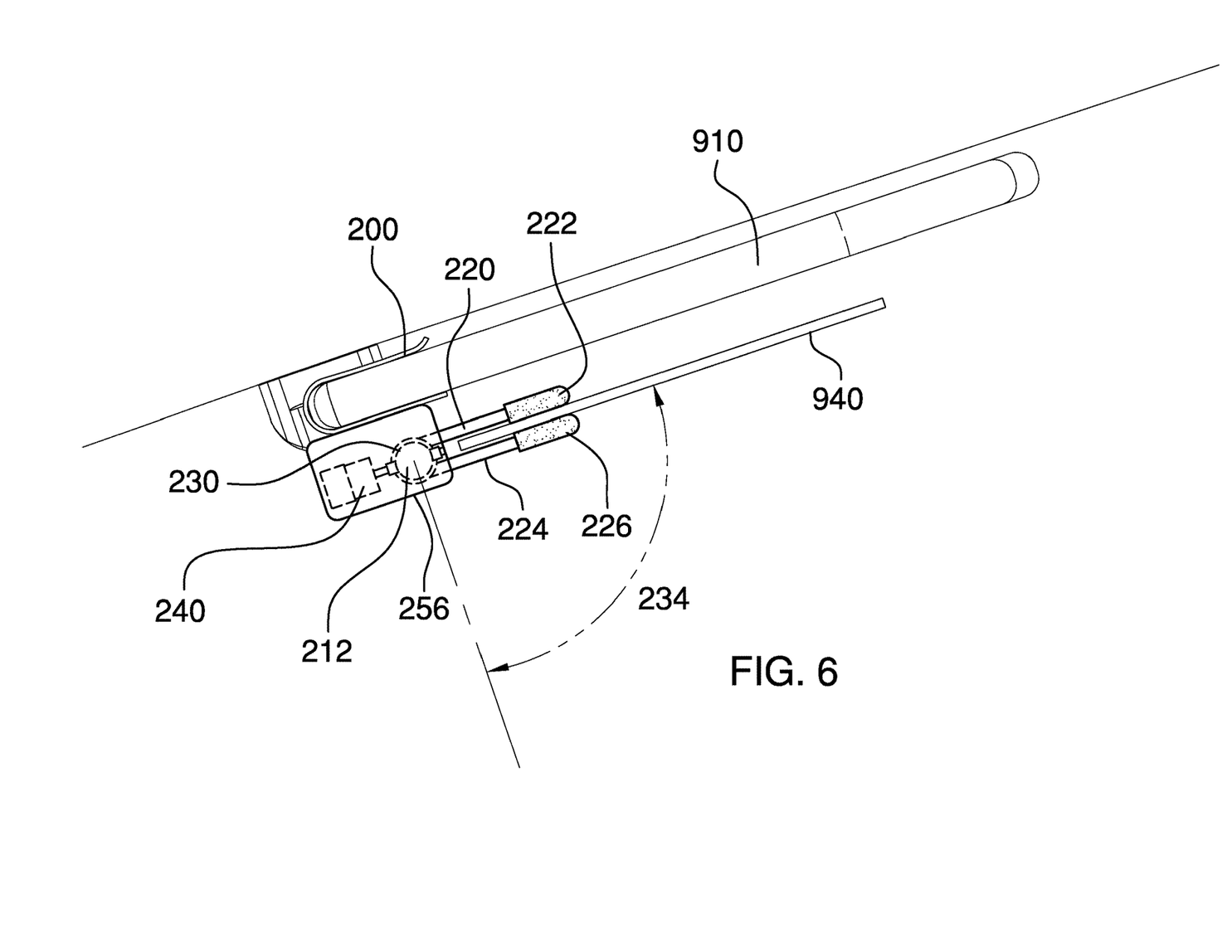
FIG. 6 is a side view of an embodiment of the disclosure illustrating the placard clip in the non-visible position.
Figure 7:
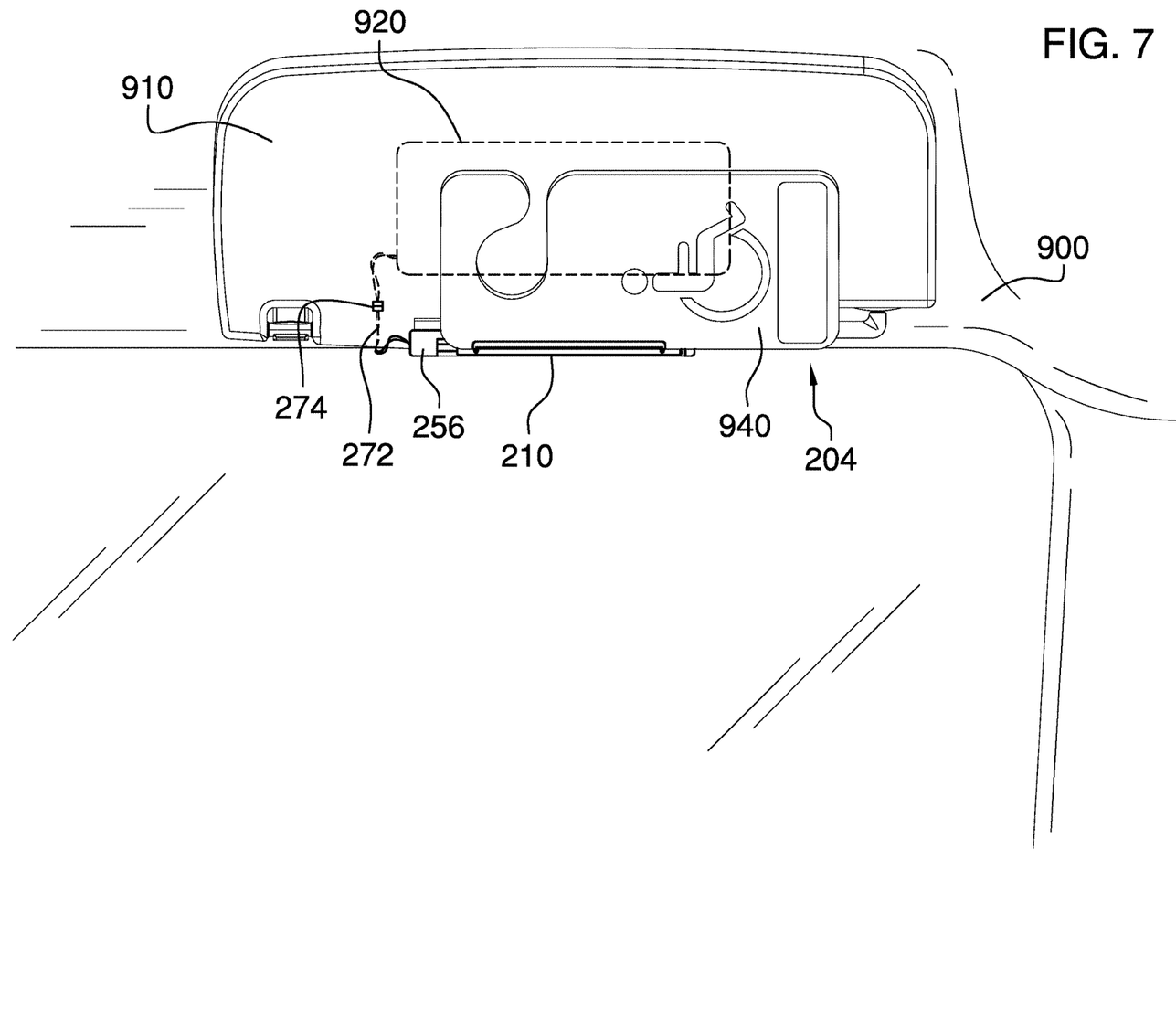
FIG. 7 is a front in-use view of an embodiment of the disclosure illustrating the parking placard rotated to the non-visible position and illustrating electrical interconnection with the vehicle.
Figure 8:
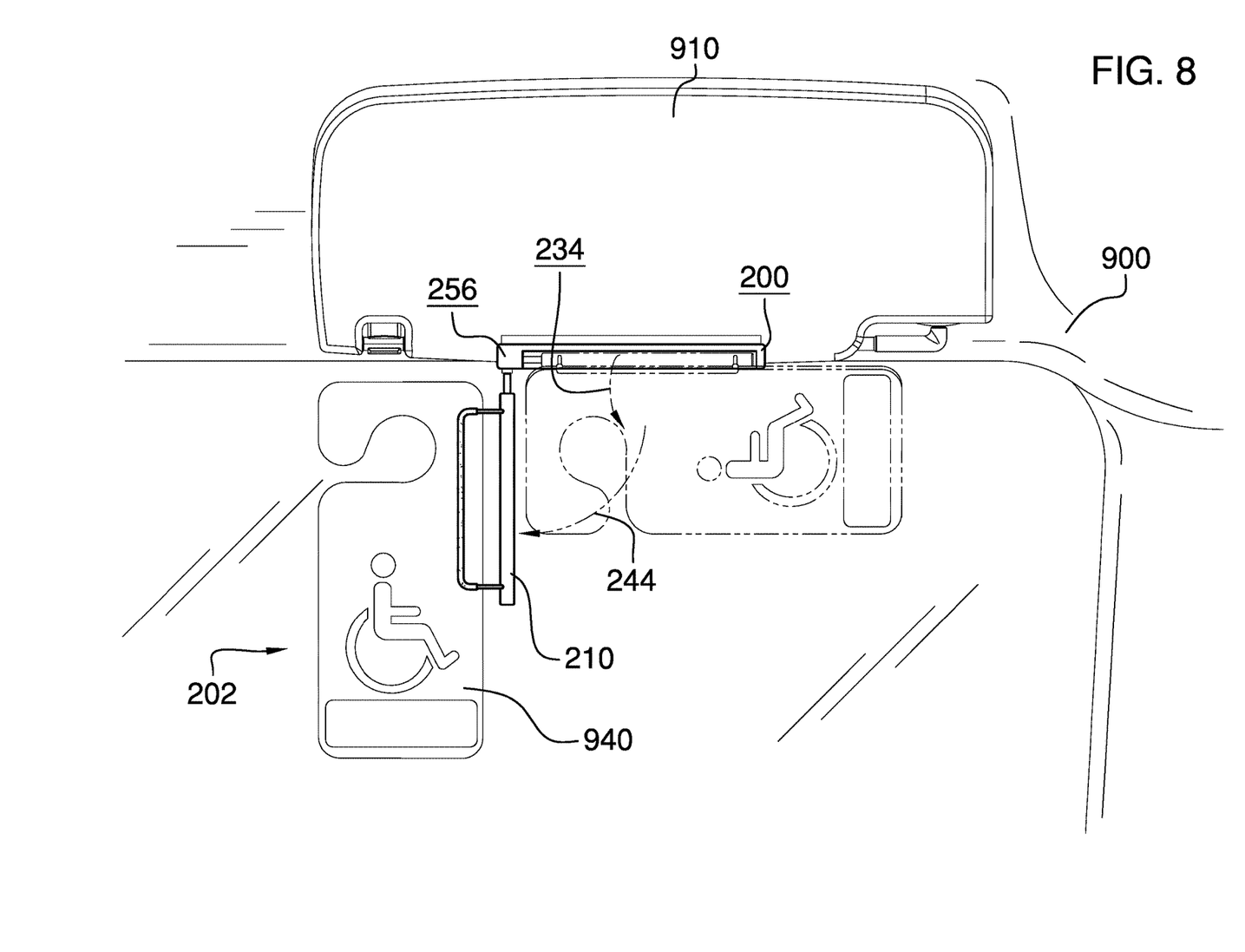
FIG. 8 is a front in-use view of an embodiment of the disclosure illustrating the parking placard rotated to the visible position.
Figure 9:
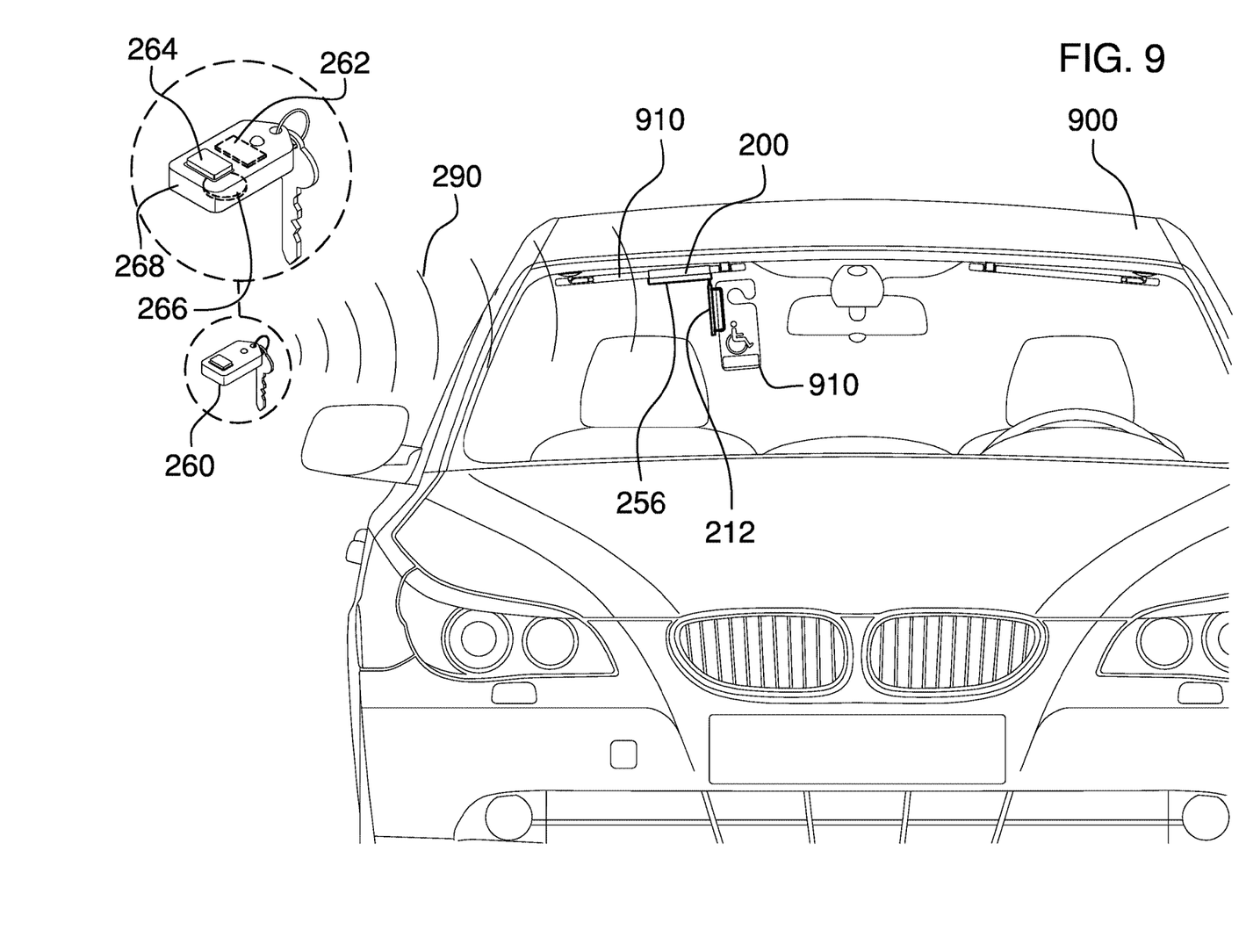
FIG. 9 is an in-use view of an embodiment of the disclosure illustrating the parking placard rotated to the visible position as seen from outside of the vehicle and illustrating activation by the remote control key fob.
Figure 10:
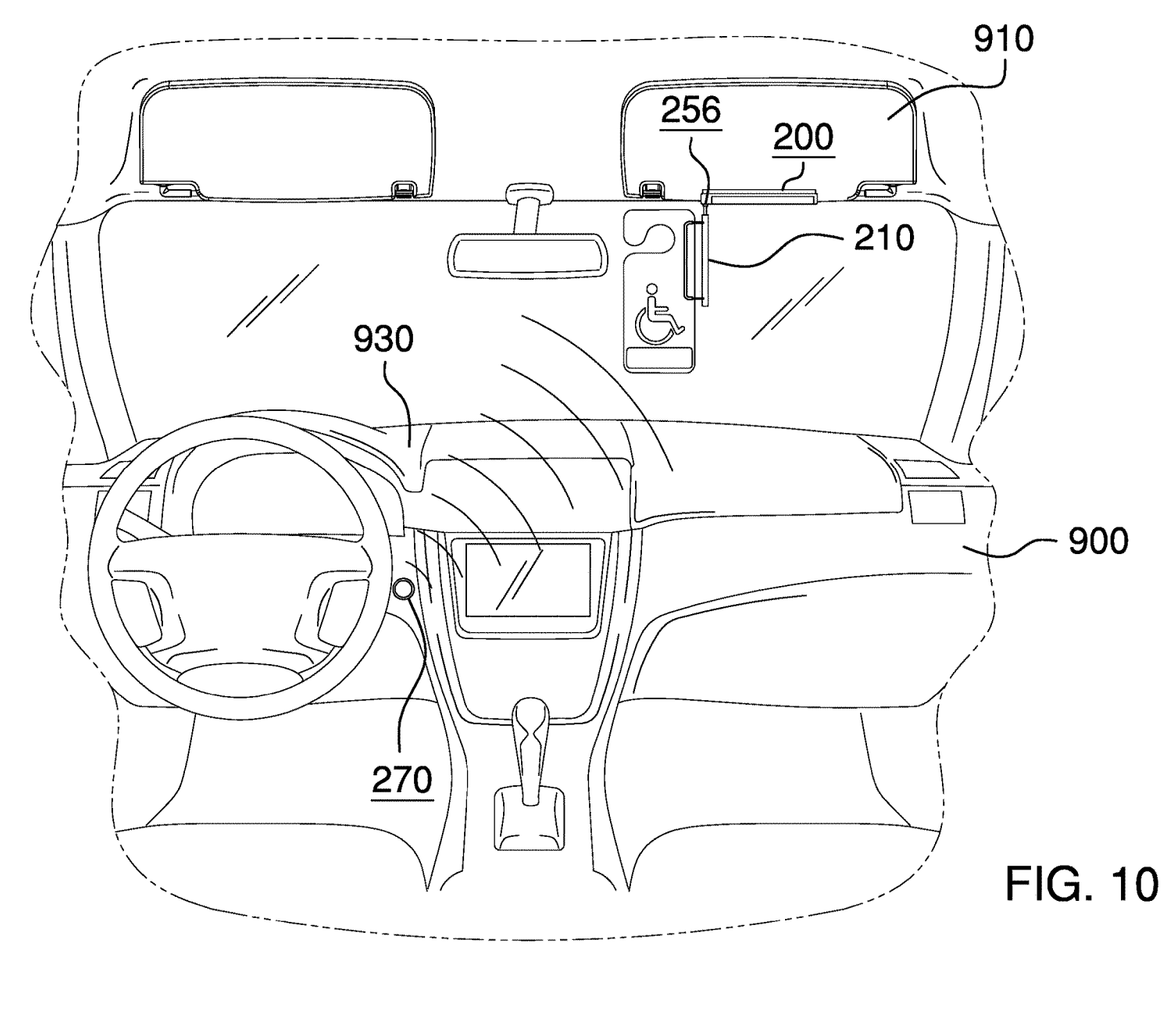
FIG. 10 is an in-use view of an embodiment of the disclosure illustrating the parking placard rotated to the visible position and illustrating the use of the in-vehicle activation control.

Detailed reference will now be made to a first potential embodiment of the disclosure, which is illustrated in FIGS. 1 through 10.

The permit holder for a vehicle sunvisor 100 (hereinafter invention) comprises a visor clip 200, a placard clip 210, a first servo motor 230, a second servo motor 240, a controller 250, and a remote control key fob 260. The invention 100 may removably couple to a sun visor 910 in a vehicle 900 via the visor clip 200. The invention 100 may removably couple a parking placard 940 to the sun visor 910 such that the parking placard 940 may be stored in a non-visible position 204 parallel to the sun visor 910 during the operation of the vehicle 900 and displayed in a visible position 202 vertically below the sun visor 910 and facing the front of the vehicle 900 when the vehicle 900 is parked. The parking placard 940 may be a sign that displays an indicia conveying a sentiment. The parking placard 940 may be moved between the non-visible position and the visible position by activating a button 264 on the remote control key fob 260. Upon receiving an activation signal 290 from the remote control key fob 260, the controller 250 may cause rotation of the first servo motor 230 and the second servo motor 240 thus moving the parking placard 940 between the non-visible position 204 and the visible position 202.

The visor clip 200 may be a mechanical structure that couples the invention 100 to the sun visor 910 of the vehicle 900. The visor clip 200 may be formed in the manner of a cantilever V spring into which the sun visor 910 is inserted. The visor clip 200 may be coupled to a housing 256.

The placard clip 210 may comprise a main placard shaft 212, a first grip 220, and a second grip 224. The placard clip 210 may retain the parking placard 940 between the first grip 220 and the second grip 224. The placard clip 210 may reposition the parking placard 940 when the main placard shaft 212 is rotated by the first servo motor 230.

The main placard shaft 212 may couple to a first motor shaft 232 of the first servo motor 230 such that rotation of the first motor shaft 232 may rotate the main placard shaft 212.

The first grip 220 may be a U-shaped armature that may be coupled to the main placard shaft 212. The second grip 224 may be a U-shaped armature that may be coupled to the main placard shaft 212. The first grip 220 may be oriented to be parallel to the second grip 224 such that the first grip 220 and the second grip 224 may retain the parking placard 940 in the placard clip 210 by pressing against opposing surfaces of the parking placard 940. The first grip 220 may be fully or partially covered by a first friction cover 222. The second grip 224 may be fully or partially covered by a second friction cover 226. The first friction cover 222 and the second friction cover 226 may protect the parking placard 940 from scratches and may increase the friction that retains the parking placard 940 in the placard clip 210.

The first servo motor 230 may be a commercially available, electrically operated servo motor. The controller 250 may energize the first servo motor 230 upon receiving the activation signal 290 sent from a transmitter 262 located in the remote control key fob 260. The first motor shaft 232 of the first servo motor 230 may be coupled to the main placard shaft 212 of the placard clip 210. Responsive to being energized by the controller 250, the first servo motor 230 may rotate the first motor shaft 232 around a first rotational axis 237 in a first rotational direction 235 or in a second rotational direction 236, thus changing a first angle 234 which may be an orientation of the parking placard 940. The first servo motor 230 may be coupled to the first motor shaft 232 of the second servo motor 240.

The second servo motor 240 may be a commercially available, electrically operated servo motor. The controller 250 may energize the second servo motor 240 upon receiving the activation signal 290 sent from the transmitter 262 located in the remote control key fob 260. A second motor shaft 242 of the second servo motor 240 may be coupled to the first servo motor 230. Responsive to being energized by the controller 250, the second servo motor 240 may rotate the second motor shaft 242 around a second rotational axis 247 in a third rotational direction 245 or in a fourth rotational direction 246, thus changing a second angle 244 which may be an orientation of the placard clip 210. The second servo motor 240 may be coupled to the housing 256.

The controller 250 may coordinate the movements of the first servo motor 230 and the second servo motor 240 such that the parking placard 940 moves from the non-visible position 204 to the visible position 202 or from the visible position 202 to the non-visible position 204 each time the activation signal 290 is received. The controller 250 may comprise a receiver 252. The controller 250 may monitor the receiver 252 for an indication that the activation signal 290 has been received and, responsive to receiving the activation signal 290, may energize the first servo motor 230 and the second servo motor 240 to move the parking placard 940 between the visible position 202 and the non-visible position 204. The controller 250 may be coupled to the housing 256.

The receiver 252 may detect the activation signal 290 transmitted by the remote control key fob 260 and may electrically notify the controller 250 of the detection of the activation signal 290.

A visor battery 254 may comprise one or more energy-storage devices. The visor battery 254 may be a source of electrical energy to operate the controller 250, the first servo motor 230, and the second servo motor 240. The visor battery 254 may be replaceable or rechargeable. The visor battery 254 may be mounted under the housing 256.

The remote control key fob 260 may be a hand-held unit that may be carried away from the vehicle 900. The remote control key fob 260 may comprise the transmitter 262, the button 264, and a fob battery 266. When the button 264 on the remote control key fob 260 is pressed, the transmitter 262 may be energized and may transmit the activation signal 290. The fob battery 266 may provide electrical energy to power the transmitter 262. The transmitter 262, the button 264, and the fob battery 266 may be located within a fob enclosure 268 which may be carried on a key ring. The transmitter 262 may continue to transmit the activation signal 290 until the button 264 is released.

The transmitter 262 may transmit a wireless signal from the remote control key fob 260 to the receiver 252 located under the housing 256 that is clipped to the sun visor 910. As a non-limiting example, the transmitter 262 may transmit an RF signal on a frequency that the receiver 252 is tuned to. In some embodiments, a passcode may be encoded in the transmitted signal such that only a specific instance of the invention 100 responds to the activation signal 290.

In some embodiments, the invention 100 may further comprise an in-vehicle activation control 270. The in-vehicle activation control 270 may be an operator control that is accessible on a dashboard 930 of the vehicle 900. The in-vehicle activation control 270 may be operationally coupled to the controller 250 via a wiring harness 272. The wiring harness 272 may also power the invention 100 from the vehicle 900. As a non-limiting example, the invention 100 may interconnect with and may be powered from a lighted vanity mirror 920. The wiring harness 272 may electrically couple the invention 100 and the vehicle 900 at a connector 274 such that the invention 100 may be disconnected and removed. Alternatively, the in-vehicle activation control 270 may transmit wirelessly to the controller 250.

In some embodiments, the button 264 on the remote control key fob 260 and the in-vehicle activation control 270 on the dashboard 930 may work identically. A first button depression may move the parking placard 940 from the non-visible position 204 to the visible position 202. A second button depression may move the parking placard 940 from the visible position 202 to the non-visible position 204. Subsequent depressions may move the parking placard 940 between the non-visible position 204 and the visible position 202.

In use, the sun visor 910 of the vehicle 900 may be inserted into the visor clip 200. The parking placard 940 may be inserted into the placard clip 210 by sliding the parking placard 940 between the first grip 220 and the second grip 224. Pressing the button 264 on the remote control key fob 260 may cause the transmitter 262 in the remote control key fob 260 to transmit the activation signal 290 to the receiver 252. When the receiver 252 reports reception of the activation signal 290 to the controller 250, the controller 250 may energize the first servo motor 230 and the second servo motor 240. Specifically, the controller 250 may energize the first servo motor 230 to rotate in the second rotational direction 236 and the second servo motor 240 to rotate in the fourth rotational direction 246 to move the parking placard 940 into the visible position 202. The controller 250 may energize the first servo motor 230 to rotate in the first rotational direction 235 and the second servo motor 240 to rotate in the third rotational direction 245 to move the parking placard 940 into the non-visible position 204.

Definitions

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, "clip" may refer to a fastener that attaches to an object by gripping or clasping the object. A clip may be spring loaded.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", may refer to connecting, either directly or indirectly, and does not necessarily imply a mechanical connection.

As used herein, "energize" and/or "energization" may refer to the application of an electrical potential to a system or subsystem.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "housing" may be a rigid or semi-rigid casing that encloses and protects one or more devices.

As used in this disclosure, the term "indicia" may refer to a set of markings that identify a sentiment.

As used in this disclosure, "orientation" may refer to the positioning and/or angular alignment of a first object relative to a second object or relative to a reference position or reference direction.

As used in this disclosure, "remote control" may refer to the establishment of control of a device from a distance or to the controlling device itself. Remote control is generally accomplished through the use of an electrical device that generates electrically based control signals that are transmitted via radio frequencies to the device. Some remote controls may use infrared light to communicate with a device.

As used in this disclosure, a "sentiment" may refer to a symbolic meaning or message that is communicated through the use of an image, potentially including a text based image.

As used in this disclosure, a "servo motor" may be an electrical motor that further incorporates a feedback circuit that allows for the angular positioning of the electric motor.

As used in this disclosure, the term "shaft" may be used to describe a rigid cylinder. A shaft is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, a "spring" may be a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used herein, "vehicle" may refer to a device that is used for transporting passengers, goods, or equipment.

As used in this disclosure, "vertical" may refer to a direction that is parallel to the local force of gravity. Unless specifically noted in this disclosure, the vertical direction is always perpendicular to horizontal.

Throughout this document references to "wire", "wires", "wired", or "wiring" may describe and/or show a single conductor when, in fact, two conductors may be required to power or control a subsystem; a convention used herein is that the common return conductor to which all electrical subsystems are connected may not be shown in order to clarify the figures. This common return conductor is a continuous electrical path and does not pass through any type of switch or other electrical component other than the possibility of passing through one or more connectors.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 10, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A permit holder for a vehicle sunvisor comprising:
   a visor clip, a placard clip, a first servo motor, a second servo motor, a controller, and a remote control key fob;
   wherein the permit holder for a vehicle sunvisor removably couples to a sun visor in a vehicle via the visor clip;
   wherein the permit holder for a vehicle sunvisor removably couples a parking placard to the sun visor such that the parking placard is stored in a non-visible position parallel to the sun visor during the operation of the vehicle and displayed in a visible position vertically below the sun visor and facing the front of the vehicle when the vehicle is parked;
   wherein the parking placard is moved between the non-visible position and the visible position by activating a button on the remote control key fob;
   wherein upon receiving an activation signal from the remote control key fob, the controller causes rotation of the first servo motor and the second servo motor thus moving the parking placard between the non-visible position and the visible position.

2. The permit holder for a vehicle sunvisor according to claim 1
   wherein the visor clip is a mechanical structure that couples the permit holder for a vehicle sunvisor to the sun visor of the vehicle;
   wherein the visor clip is formed in the manner of a cantilever V spring into which the sun visor is inserted;
   wherein the visor clip is coupled to a housing.

3. The permit holder for a vehicle sunvisor according to claim 2
   wherein the placard clip comprises a main placard shaft, a first grip, and a second grip;
   wherein the placard clip retains the parking placard between the first grip and the second grip;
   wherein the placard clip repositions the parking placard when the main placard shaft is rotated by the first servo motor.

4. The permit holder for a vehicle sunvisor according to claim 3
   wherein the main placard shaft couples to a first motor shaft of the first servo motor such that rotation of the first motor shaft rotates the main placard shaft.

5. The permit holder for a vehicle sunvisor according to claim 4
   wherein the first grip is a U-shaped armature that is coupled to the main placard shaft;
   wherein the second grip is a U-shaped armature that is coupled to the main placard shaft.

6. The permit holder for a vehicle sunvisor according to claim 5
   wherein the first grip is oriented to be parallel to the second grip such that the first grip and the second grip retains the parking placard in the placard clip by pressing against opposing surfaces of the parking placard.

7. The permit holder for a vehicle sunvisor according to claim 6
   wherein the first grip is fully or partially covered by a first friction cover;
   wherein the second grip is fully or partially covered by a second friction cover;
   wherein the first friction cover and the second friction cover protect the parking placard from scratches and increase the friction that retains the parking placard in the placard clip.

8. The permit holder for a vehicle sunvisor according to claim 6
   wherein the first servo motor is an electrically operated servo motor;
   wherein the controller energizes the first servo motor upon receiving the activation signal sent from a transmitter located in the remote control key fob;
   wherein the first motor shaft of the first servo motor is coupled to the main placard shaft of the placard clip;
   wherein responsive to being energized by the controller, the first servo motor rotates the first motor shaft around a first rotational axis in a first rotational direction or in a second rotational direction, thus changing a first angle which is an orientation of the parking placard;
   wherein the first servo motor is coupled to the first motor shaft of the second servo motor.

9. The permit holder for a vehicle sunvisor according to claim 8
   wherein the second servo motor is an electrically operated servo motor;
   wherein the controller energizes the second servo motor upon receiving the activation signal sent from the transmitter located in the remote control key fob;
   wherein a second motor shaft of the second servo motor is coupled to the first servo motor;
   wherein responsive to being energized by the controller, the second servo motor rotates the second motor shaft around a second rotational axis in a third rotational direction or in a fourth rotational direction, thus changing a second angle which is an orientation of the placard clip;
   wherein the second servo motor is coupled to the housing.

10. The permit holder for a vehicle sunvisor according to claim 9
    wherein the controller coordinates the movements of the first servo motor and the second servo motor such that the parking placard moves from the non-visible position to the visible position or from the visible position to the non-visible position each time the activation signal is received;
    wherein the controller comprises a receiver;
    wherein the controller monitors the receiver for an indication that the activation signal has been received and, responsive to receiving the activation signal, energizes the first servo motor and the second servo motor to move the parking placard between the visible position and the non-visible position;
    wherein the controller is coupled to the housing.

11. The permit holder for a vehicle sunvisor according to claim 10 wherein the receiver detects the activation signal transmitted by the remote control key fob and electrically notifies the controller of the detection of the activation signal.

12. The permit holder for a vehicle sunvisor according to claim 11
wherein a visor battery comprises one or more energy-storage devices;
wherein the visor battery is a source of electrical energy to operate the controller, the first servo motor, and the second servo motor;
wherein the visor battery is replaceable or rechargeable;
wherein the visor battery is mounted under the housing.

13. The permit holder for a vehicle sunvisor according to claim 12
wherein the remote control key fob is a hand-held unit that is carried away from the vehicle;
wherein the remote control key fob comprises the transmitter, the button, and a fob battery;
wherein when the button on the remote control key fob is pressed, the transmitter is energized and transmits the activation signal;
wherein the fob battery provides electrical energy to power the transmitter;
wherein the transmitter, the button, and the fob battery are located within a fob enclosure.

14. The permit holder for a vehicle sunvisor according to claim 13
wherein the transmitter continues to transmit the activation signal until the button is released.

15. The permit holder for a vehicle sunvisor according to claim 13
wherein the transmitter transmits a wireless signal from the remote control key fob to the receiver located under the housing that is clipped to the sun visor.

16. The permit holder for a vehicle sunvisor according to claim 15
wherein the permit holder for a vehicle sunvisor further comprises an in-vehicle activation control;
wherein the in-vehicle activation control is an operator control that is accessible on a dashboard of the vehicle;
wherein the in-vehicle activation control is operationally coupled to the controller.

17. The permit holder for a vehicle sunvisor according to claim 16
wherein the coupling between the in-vehicle activation control and the controller is wireless.

18. The permit holder for a vehicle sunvisor according to claim 16
wherein the coupling between the in-vehicle activation control and the controller is via a wiring harness.

19. The permit holder for a vehicle sunvisor according to claim 16
wherein a first button depression moves the parking placard from the non-visible position to the visible position;
wherein a second button depression moves the parking placard from the visible position to the non-visible position;
wherein subsequent depressions move the parking placard between the non-visible position and the visible position.

* * * * *